(12) United States Patent
Ootake et al.

(10) Patent No.: US 11,597,431 B2
(45) Date of Patent: Mar. 7, 2023

(54) MOTOR CONTROL DEVICE

(71) Applicant: DENSO CORPORATION, Kariya (JP)

(72) Inventors: Hiroyasu Ootake, Kariya (JP); Nobuyori Nakazima, Kariya (JP)

(73) Assignee: DENSO CORPORATION, Kariya (JP)

( * ) Notice: Subject to any disclaimer, the term of this patent is extended or adjusted under 35 U.S.C. 154(b) by 385 days.

(21) Appl. No.: 16/835,781

(22) Filed: Mar. 31, 2020

(65) Prior Publication Data

US 2020/0317257 A1    Oct. 8, 2020

(30) Foreign Application Priority Data

Apr. 2, 2019 (JP) .............................. JP2019-070404

(51) Int. Cl.
*B62D 5/04* (2006.01)
*H02P 27/06* (2006.01)

(52) U.S. Cl.
CPC ......... *B62D 5/0463* (2013.01); *B62D 5/0481* (2013.01); *H02P 27/06* (2013.01)

(58) Field of Classification Search
CPC .... B62D 5/0463; B62D 5/0481; B62D 5/046; H02P 27/06; H02P 21/06; H02P 29/032
See application file for complete search history.

(56) References Cited

U.S. PATENT DOCUMENTS

| 2006/0273247 | A1* | 12/2006 | Sakamaki | B62D 5/049 250/231.16 |
| 2013/0013154 | A1* | 1/2013 | Aoki | B62D 5/0481 701/41 |
| 2016/0181954 | A1* | 6/2016 | Satou | H02P 6/28 318/400.22 |
| 2017/0005600 | A1* | 1/2017 | Takesaki | H02P 21/05 |
| 2018/0287538 | A1 | 10/2018 | Nakashima et al. | |

FOREIGN PATENT DOCUMENTS

| JP | 2009-046005 A | 3/2009 |
| JP | 2011-218878 A | 11/2011 |
| JP | 6428248 B2 | 11/2018 |

* cited by examiner

*Primary Examiner* — Antony M Paul
(74) *Attorney, Agent, or Firm* — Maschoff Brennan

(57) ABSTRACT

A motor control device controls energization of a motor by interchangeably converting a direct current electric power of a power source and an alternating current electric power of the motor with a power conversion circuit according to a power running operation and a regeneration operation of the motor. A voltage instruction value calculation unit calculates a q-axis voltage instruction value and a d-axis voltage instruction value by feedback control of dq-axis currents. A voltage instruction value limit unit limits at least one of the q-axis voltage instruction value and the d-axis voltage instruction value. The voltage instruction value limit unit performs a q-axis voltage limit prioritize process for limiting the q-axis voltage instruction value over the d-axis voltage instruction value, or a d-axis voltage limit prioritize process for limiting the d-axis voltage instruction value over the q-axis voltage instruction value, during the regenerative operation of the motor.

9 Claims, 10 Drawing Sheets

MOTOR CONTROL DEVICE

CROSS REFERENCE TO RELATED APPLICATION

The present application is based on and claims the benefit of priority of Japanese Patent Application No. 2019-070404, filed on Apr. 2, 2019, the disclosure of which is incorporated herein by reference.

TECHNICAL FIELD

The present disclosure generally relates to a motor control device.

BACKGROUND INFORMATION

The related art includes, in an electric power steering apparatus, a motor control device that controls energization of a motor by operating a power conversion circuit according to a power running operation and a regenerative operation of a steering assist motor. Here, a situation where the regenerative operation occurs may include, for example, a time when a road wheel of a vehicle rides on an obstacle while traveling thereby causing a reverse input to an output shaft of a motor or a time when a steering wheel is operated while the vehicle is jacked up (i.e., when the road wheel has no load). In addition, there is a possibility that the regenerative operation may occur when the vehicle is steered suddenly for emergency avoidance during a travel or when a voltage of a power supply device is low.

For example, in the related art, a dq-axis voltage instruction value is limited so that an absolute value of a power source current becomes equal to or less than a target value, for preventing damage to switching elements or the like due to regenerative energy during the regenerative operation of the motor.

In the present disclosure, "reducing a power source current" means bringing the power source current defined by a negative value close to 0 during the regenerative operation. The motor control device of the related art uniformly limits a d-axis voltage instruction value and a q-axis voltage instruction value mainly for the purpose of reducing the power source current for the protection of electronic components, without considering a motor current and/or a generated torque at the time of limiting the instruction values.

SUMMARY

It is an object of the present disclosure is to provide a motor control device capable of reducing a power source current while satisfying a request for securing or reducing a brake torque of a motor during a regenerative operation.

BRIEF DESCRIPTION OF THE DRAWINGS

Objects, features, and advantages of the present disclosure will become more apparent from the following detailed description made with reference to the accompanying drawings, in which.

DETAILED DESCRIPTION

A motor control device is described with reference to plural embodiments shown in the accompanying drawings. In the plurality of embodiments, the same configuration is denoted by the same reference number, and redundant description thereof is omitted. In the following description, the first and second embodiments are collectively referred to as a present embodiment. The motor control device of the present embodiment is applied to an electric power steering apparatus that generates a steering assist torque by a motor.

Figure 1:
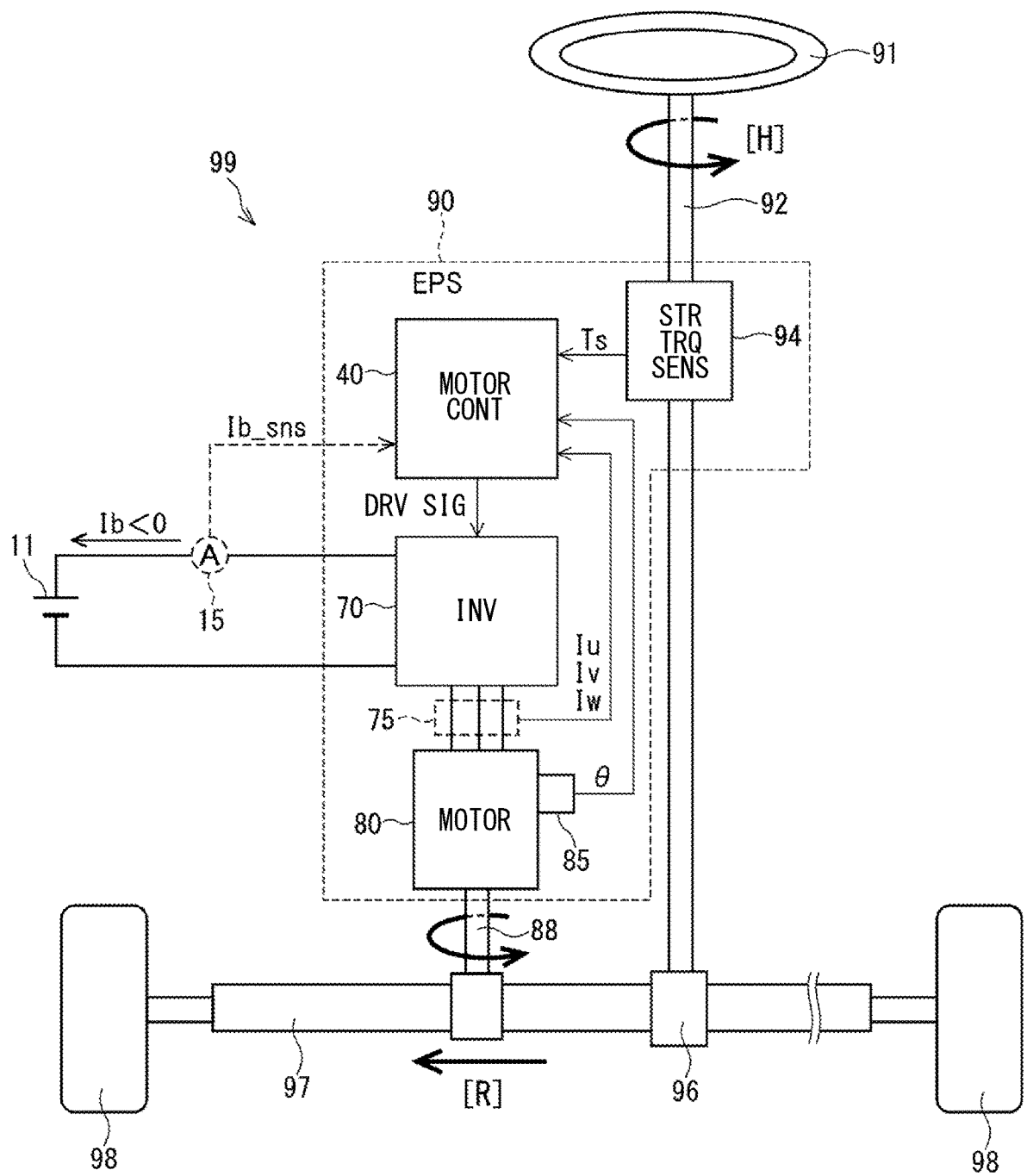
FIG. 1 is a configuration diagram of an electric power steering apparatus to which a motor control device of an embodiment is applied.

FIG. 1 shows a configuration of a steering system 99 including an electric power steering apparatus 90. Although the electric power steering apparatus 90 of FIG. 1 is a rack assist type, a motor control device 40 of the present embodiment can also be similarly applied to a column assist type electric power steering apparatus. The steering system 99 includes a steering wheel 91, a steering shaft 92, a pinion gear 96, a rack shaft 97, road wheels 98, the electric power steering apparatus 90 and the like. The steering shaft 92 is coupled to the steering wheel 91.

The pinion gear 96 provided at an axial end of the steering shaft 92 engages with the rack shaft 97. A pair of road wheels 98 are provided at both ends of the rack shaft 97 via, for example, tie rods. When a driver rotates the steering wheel 91, the steering shaft 92 coupled to the steering wheel 91 rotates. A rotational motion of the steering shaft 92 is converted into a linear motion of the rack shaft 97 by the pinion gear 96 and the pair of road wheels 98 is steered to an angle corresponding to a displacement amount of the rack shaft 97.

The electric power steering apparatus 90 includes a motor 80, a steering torque sensor 94, the motor control device 40, and an inverter 70. The motor 80 is a multiphase AC brushless motor, and is a three-phase AC brushless motor in the present embodiment. In other embodiments, the number of phases may be four or more. The steering torque sensor 94 is provided in the middle of the steering shaft 92 and detects a steering torque Ts of the driver.

In the electric power steering apparatus 90, an operation of outputting an assist torque to the motor 80 in accordance with a driver's steering torque corresponds to a power running operation. Further, when the wheel 98 rides on an obstacle during travel and a reverse input is applied to an output shaft 88 of the motor 80, or when the steering wheel 91 is operated in a no-load state with the wheel 98 jacked up, the motor 80 generates a counter electromotive force, which corresponds to a regenerative operation. Further, the regenerative operation may possibly occur also when the vehicle is suddenly steered for emergency avoidance during travel or when a voltage of the power supply device is low. When a regenerative operation is caused by an input from the steering wheel 91, the input is transmitted from [H] (i.e., steering wheel) to [R] (i.e., rack shaft). On the other hand, when a regenerative operation is caused by an input from the rack shaft 97, the input is transmitted from [R] to [H].

The motor control device 40 obtains phase currents Iu, Iv, Iw detected by a current sensor 75 and an electrical angle θ detected by a rotation angle sensor 85. The motor control device 40 controls the driving of the motor 80 so that the motor 80 generates a desired assist torque based on the steering torque Ts during the power running operation. Further, during the regenerative operation, the motor control device 40 regenerates an energy of the counter electromotive force generated by the motor 80 by a reverse input or by an operation of the steering wheel 91 to a power source 11 that is a DC power source such as a battery.

Each of the calculation units of the motor control device 40 is implemented by a microcomputer, a pre-driver, or the like, and includes a CPU, a ROM, an I/O (not shown), a bus line that connects these configurations, and the like. The motor control device 40 executes control by software processing i.e., by executing a program stored in advance by the CPU or by hardware processing i.e., by using a dedicated electronic circuit.

The inverter 70 as a "power conversion circuit" is composed of a plurality of switching elements in upper and lower arms that are bridge-connected, and a smoothing capacitor is provided at its input section. Since such a configuration of an inverter is a known technique, the illustration is omitted. The motor control device 40 operates the inverter 70 for performing the power running operation and the regenerative operation of the motor 80 by interchangeably converting the DC power of the power source 11 to the AC power of the motor 80 and vice versa, and controls the energization of the motor 80.

An electric current flowing between the power source 11 and the inverter 70 is referred to as a "power source current Ib." The power source current Ib flows from the power source 11 toward the inverter 70 during the power running operation, and flows from the inverter 70 toward the power source 11 during the regenerative operation. Hereafter, the sign of the power source current Ib is defined as positive (i.e., +) in a power running operation and negative (i.e., −) in the regenerative operation. For example, a detection value Ib_sns of the power source current detected by a power source current sensor 15 indicated by a broken line may be obtained by the motor control device 40. However, in the present embodiment, an example is provided in which a power source current sensor is not provided and the motor control device 40 calculates an estimation value of the power source current as a primary configuration.

Note that the related art includes a technique for reducing an absolute value |Ib| of the power source current is disclosed, in which a voltage instruction value is limited in order to prevent damage to the switching elements caused by a regenerative energy during the regenerative operation of the motor. However, in the present disclosure, "limiting a voltage instruction value" means correcting a voltage instruction value in a direction approaching zero. Further, "reducing a power source current" means bringing a power source current defined by a negative value close to zero during the regenerative operation.

A motor control device in the related art uniformly, i.e., always, limits a d-axis voltage instruction value and a q-axis voltage instruction value mainly for the purpose of reducing the power source current for the protection of the electronic components. However, as described in detail later, if the d-axis voltage instruction value is limited during the regenerative operation, a brake torque generated reversely to a rotation direction is reduced, and an impact of the reverse input is likely to be transmitted to mechanical parts such as gears, which is problematic. Thus, there may be a demand for securing the brake torque of the motor 80 in order to reduce the impact on the mechanical parts.

On the other hand, there may also be a problem that an excessive steering force is required if a large brake torque is generated during the regenerative operation that is caused by an operation of the steering wheel (i.e., may also be designated as a steering operation, hereafter). Therefore, there may be a demand for reducing the brake torque of the motor 80 so as not to hinder the steering operation. In view of the above-described situation, in the present embodiment, reduction of the power source current while complying with a request for securing or reducing the brake torque of the motor during the regenerative operation is targeted.

Next, detailed configuration of the motor control device 40 according to the present embodiment and the operational effects due to the limitation of the dq-axis voltage instruction value is described as follows, i.e., as the first and second embodiments. The reference number of the motor control device is 401 in the first embodiment, and 402 in the second embodiment.

First Embodiment

Figure 2:
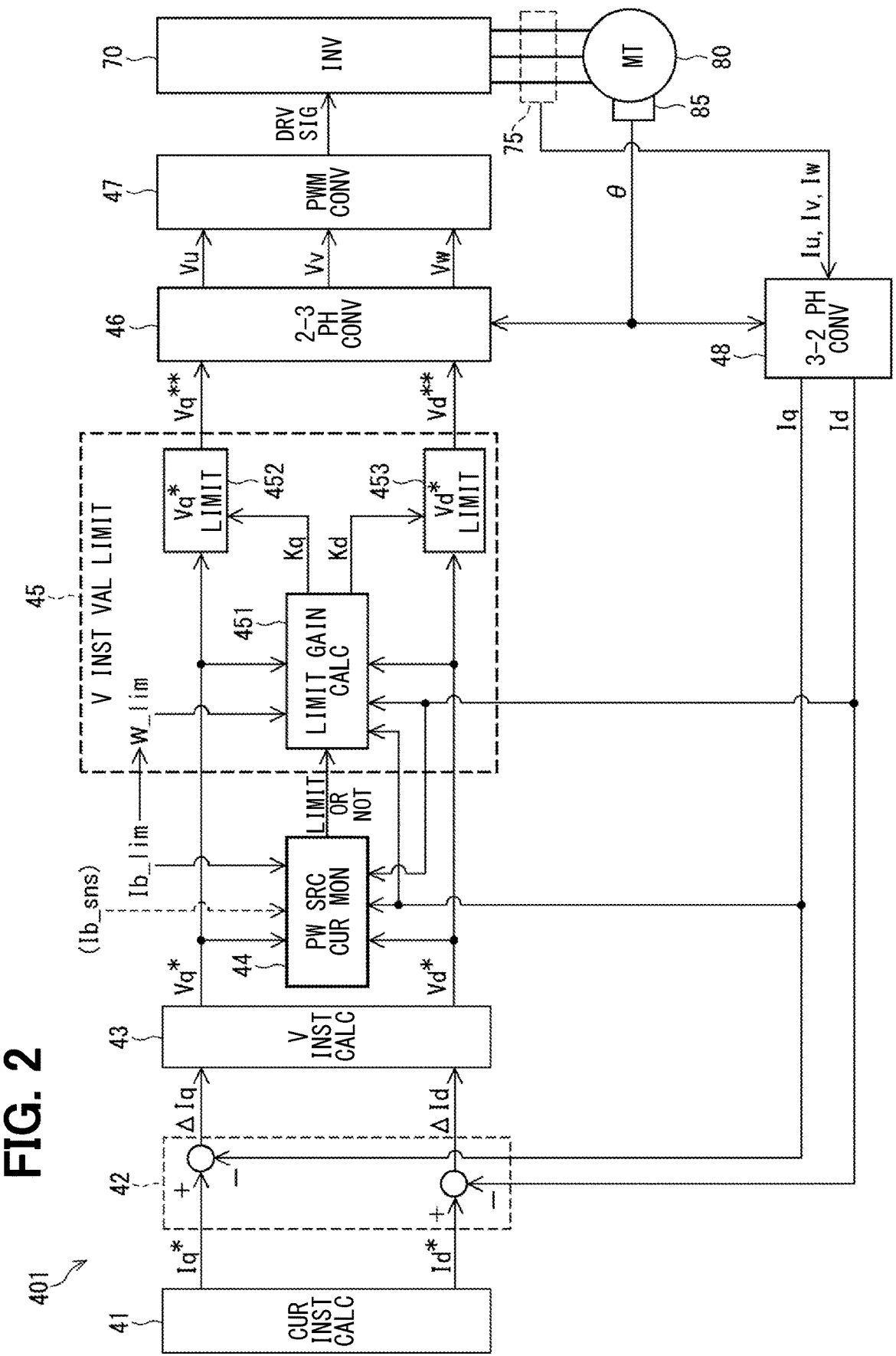
FIG. 2 is a control block diagram of the motor control device according to a first embodiment.

A motor control device 401 according to the first embodiment is described with reference to FIGS. 2 to 8. As shown in FIG. 2, the motor control device 401 includes a current instruction value calculation unit 41, a current deviation calculation unit 42, a voltage instruction value calculation unit 43, a power source current monitor unit 44, a voltage instruction value limit unit 45, and a two-phase three-phase conversion unit 46, a pulse width modulation (PWM) conversion unit 47, a three-phase two-phase conversion unit 48, and the like. Since the configuration other than the power source current monitor unit 44 and the voltage instruction value limit unit 45 is a general current feedback control configuration, it is briefly described. In the specification of the present disclosure, when the electric current and voltage on the dq axis are written together, the q axis is basically written first and the d axis is written later.

The current instruction value calculation unit 41 calculates dq-axis current instruction values Iq* and Id*. The three-phase two-phase conversion unit 48 converts the phase currents Iu, Iv, Iw detected by the current sensor 75 into dq-axis currents Iq, Id using the electrical angle θ. The current deviation calculation unit 42 calculates current deviations ΔIq and ΔId between the dq-axis current instruction values Iq* and Id* and the dq-axis currents Iq and Id. The voltage instruction value calculation unit 43 calculates a q-axis voltage instruction value Vq* and a d-axis voltage instruction value Vd* so that the current deviations ΔIq and ΔId approach 0 by a feedback control of the dq-axis currents Iq and Id.

The voltage instruction value limit unit 45 limits at least one of the q-axis voltage instruction value Vq* and the d-axis voltage instruction value Vd*. A detailed configuration of the voltage instruction value limit unit 45 is described later. A symbol of the voltage instruction value before the limitation by the voltage instruction value limit unit 45 has "* (asterisk)" added thereto, while a symbol of the symbol of the voltage instruction value after the limitation including a case where the voltage instruction value is not substantially limited has " (double asterisk)" added thereto, for the distinction therebetween. When the voltage instruction value is not substantially limited, the voltage instruction values Vq and Vd** after limitation are the same (i.e., have the same values) as the voltage instruction values Vq* and Vd* before limitation.

The two-phase three-phase conversion unit 46 converts the post-limit q-axis voltage instruction value Vq and the post-limit d-axis voltage instruction value Vd into three-phase voltage instruction values Vu, Vv, and Vw using the electrical angle θ. The PWM conversion unit 47 generates a switching pulse signal as a drive signal based on the three-phase voltage instruction values Vu, Vv, and Vw, and outputs the switching pulse signal to the inverter 70. When the inverter 70 operates according to the drive signal, the DC power of the power source 11 and the AC power of the motor 80 are interchangeably converted, and the energization of the motor 80 is controlled.

Further, the motor control device 401 of the present embodiment has the power source current monitor unit 44. The power source current monitor unit 44 compares an absolute value of an estimation value or a detection value of the power source current with a target power source current Ib_lim. The power source current monitor unit 44 illustrated in FIG. 2 calculates an estimated power source current Ib_est that is an estimation value of the power source current based on the dq-axis voltage instruction values Vq* and Vd* and the dq-axis currents Iq and Id. The following description is based on such a configuration. However, the power source current monitor unit 44 may obtain the detection value Ib_sns of the power source current detected by the power source current sensor 15 shown in FIG. 1.

The target power source current Ib_lim is an upper limit target of the absolute value |Ib| of the power source current, and is defined by, for example, 0 or a positive value, that is, a value of "0 or more." The target power source current Ib_lim may be stored as a fixed value in a reference state such as an inverter input voltage or an inverter ambient temperature. Alternatively, the inverter input voltage may be set as a variable by using parameters, such as the inverter ambient temperature, and the like.

The power source current monitor unit 44 determines whether or not the voltage instruction value needs to be limited based on a target saturation rate that is a value obtained by dividing the target power source current Ib_lim by the absolute value of the estimated power source current Ib_est, and notifies the voltage instruction value limit unit 45 of the determination result. Details of such processing is described later with reference to FIGS. 5 and 6. In other embodiments, the power source current monitor unit 44 may be omitted.

The voltage instruction value limit unit 45 includes a limit gain calculator 451, a q-axis voltage instruction value limiter 452, and a d-axis voltage instruction value limiter 453. The limit gain calculator 451 calculates dq-axis voltage limit gains Kq and Kd based on the dq-axis voltage instruction values Vq* and Vd*, the dq-axis currents Iq and Id, and a total target power W_lim. The total target power W_lim is an electric power that is allowed to be input to the inverter 70 by the regenerative operation, and is defined as a product of the target power source current Ib_lim and a reference voltage Vref, i.e., as "a value equal to or greater than 0."

When the target power source current Ib_lim is variably set, the total target power W_lim also varies accordingly.

The q-axis voltage instruction value limiter 452 calculates a post-limit q-axis voltage instruction value Vq** by multiplying the q-axis voltage instruction value Vq* by the q-axis voltage limit gain Kq. The d-axis voltage instruction value limiter 453 calculates a post-limit d-axis voltage instruction value Vd** by multiplying the d-axis voltage instruction value Vd* by the d-axis voltage limit gain Kd. In the related art, the same value is used as a suppression gain Kres for both of the q axis and the d axis, without distinction.

On the other hand, in the present embodiment, the q-axis voltage limit gain Kq and the d-axis voltage limit gain Kd are set to have respectively different values. In case of "Kq<Kd", a "q-axis voltage limit prioritize process" for limiting the q-axis voltage instruction value Vq* over (i.e., before limiting) the d-axis voltage instruction value Vd* is performed. In case of "Kd<Kq," a "d-axis voltage limit prioritize process" is performed to limit the d-axis voltage instruction value Vd* over (i.e., before limiting) the q-axis voltage instruction value Vq*. That is, the motor control device 40 according to the present embodiment performs one or both of the "q-axis voltage limit prioritize process" and the "d-axis voltage limit prioritize process."

The motor control device 401 according to the first embodiment is set in advance so as to perform either of the q-axis voltage limit prioritize process or the d-axis voltage limit prioritize process at least once in a period from starting to stopping. For example, when applied to a vehicle in which the strength of a mechanical component that receives an impact of a reverse input is relatively low, priority is given to securing (i.e., securely providing) a brake torque, and the q-axis voltage limit prioritize process is set to be always performed. On the other hand, when applied to a vehicle in which the strength of a mechanical component that receives an impact of a reverse input is relatively high, priority is given to the reduction of the brake torque, and the d-axis voltage limit prioritize process is set to be always performed. Alternatively, the user may be allowed to change the setting, while the above setting is used as a default. In any case, unless the setting is changed, it is not assumed that the q-axis voltage limit prioritize process and the d-axis voltage limit prioritize process are freely switched during the operation.

Next, specific examples of the q-axis voltage limit prioritize process and the d-axis voltage limit prioritize process are described with reference to the flowcharts of FIGS. 3 and 4. In the following flowcharts, a symbol S indicates a step. Hereafter, the q axis in the q-axis voltage limit prioritize process and the d axis in the d-axis voltage limit prioritize process are respectively referred to as a "priority axis" which is an axis "where the voltage instruction value is restricted with priority." Further, the d axis in the q-axis voltage limit prioritize process and the q axis in the d-axis voltage limit prioritize process are respectively referred to as a "non-priority axis" which is "an other axis other than the priority axis."

Figure 3:
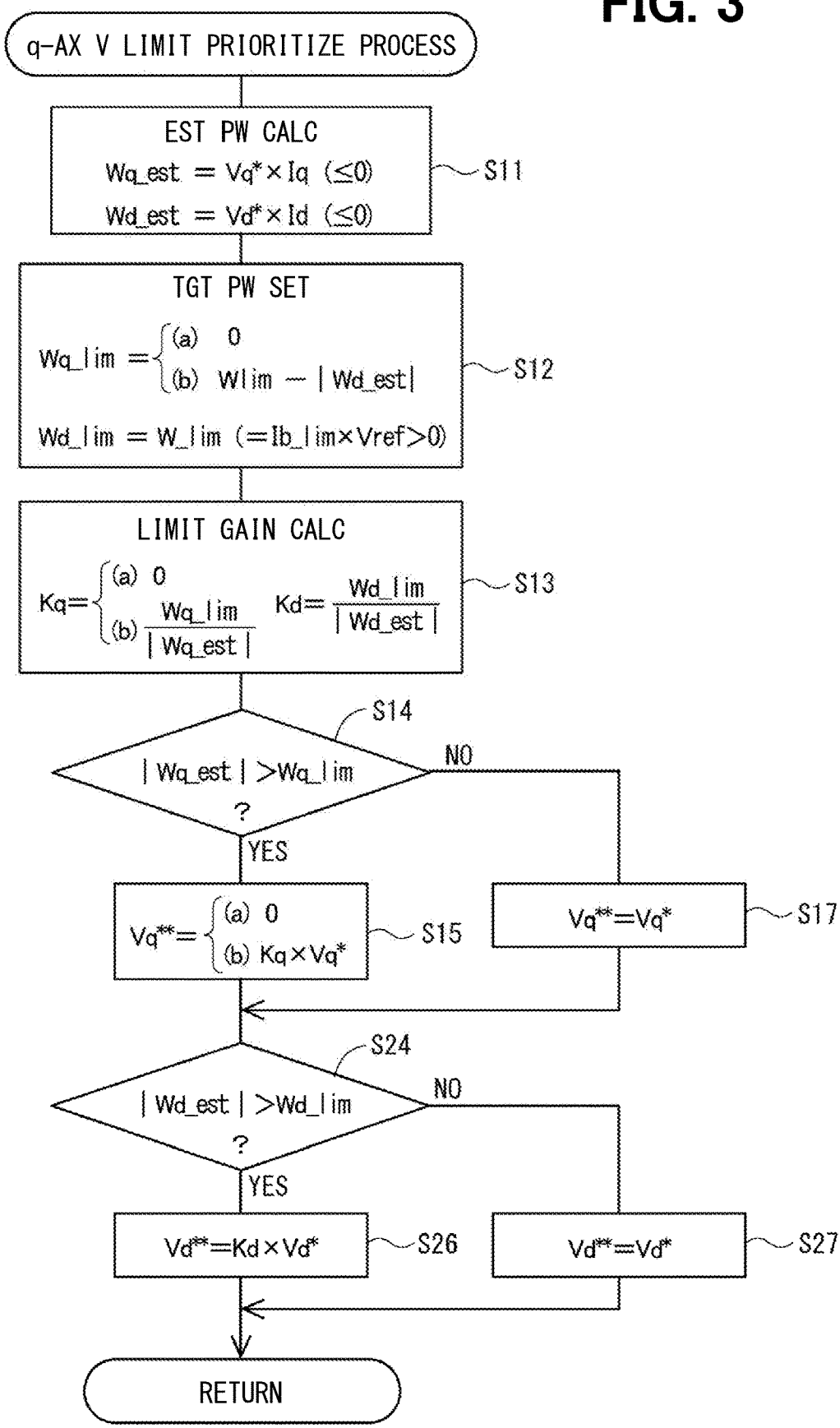
FIG. 3 is a flowchart of a q-axis voltage limit prioritize process.
Figure 4:
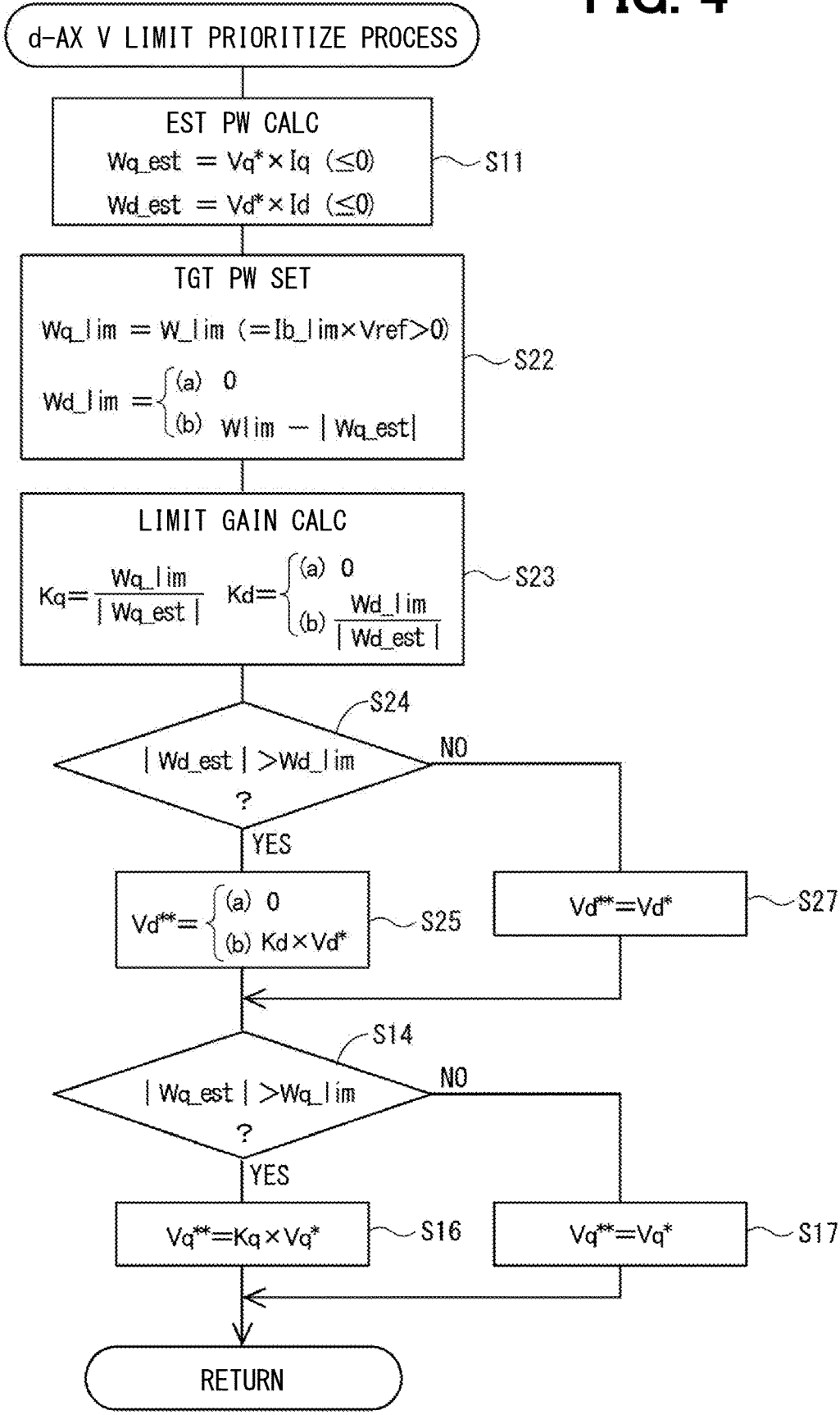
FIG. 4 is a flowchart of a d-axis voltage limit prioritize process.

Examples of setting the target power for the priority axis in two patterns (a) and (b) are described together with reference to FIGS. 3 and 4.

In the q-axis voltage limit prioritize process shown in FIG. 3, the q-axis voltage instruction value limiter 452 performs S15 and S17, and the d-axis voltage instruction value limiter 453 performs S26 and S27. The other steps are assumed to be performed by the limit gain calculator 451. The limit gain calculator 451 stores the total target power W_lim internally, or obtains a value calculated in other block.

In S11, the limit gain calculator 451 calculates a q-axis estimated power Wq_est, which is a product of the q-axis voltage instruction value Vq* and the q-axis current Iq, using an equation (1.1). The limit gain calculator 451 calculates a d-axis estimated power Wd_est, which is a product of the d-axis voltage instruction value Vd* and the d-axis current Id, using an equation (1.2).

$$Wq\_est = Vq^* \times Iq \tag{1.1}$$

$$Wd\_est = Vd^* \times Id \tag{1.2}$$

As is described later with reference to FIG. 7 and FIG. 8, in a rotation number range where the voltage instruction value limitation is performed during the regenerative operation, the values are set as "Vq*≥0, Vd*≥0, Iq<0." Although not shown in FIGS. 7 and 8, since the d-axis current Id is also Id<0, the values are "Wq_est≤0, Wd_est≤0" in principle. However, when the values are "Wq_est>0 or Wd_est>0" exceptionally, the upper limit may be set to 0, as a precaution.

A q-axis power and a d-axis power constituting the total target power W_lim are respectively defined as a q-axis target power Wq_lim and a d-axis target power Wd_lim. In the present embodiment, the q-axis target power Wq_lim and the d-axis target power Wd_lim are both defined (i.e., regulated) as a value of 0 or more according to the total target power W_lim.

In S12, the limit gain calculator 451 sets the q-axis target power Wq_lim and the d-axis target power Wd_lim. In the pattern (a), the q-axis target power Wq_lim, which is on the priority axis, is set to 0 by an equation (2.1a). In the pattern (b), the q-axis target power Wq_lim is set to a value obtained by subtracting an absolute value |Wd_est| of the estimated power of the d axis that is the non-priority axis from the total target power W_lim by an equation (2.1 b).

$$Wq\_\mathrm{lim} = 0 \tag{2.1a}$$

$$Wq\_\mathrm{lim} = W\_\mathrm{lim} - |Wd\_est| \tag{2.1b}$$

The d-axis target power Wd_lim, which is on the non-priority axis, is set to the total target power W_lim by an equation (3.1).

$$Wd\_\mathrm{lim} = W\_\mathrm{lim} \tag{3.1}$$

In S13, the limit gain calculator 451 calculates a q-axis voltage limit gain Kp obtained by dividing the q-axis target power Wq_lim by the absolute value |Wq_est| of the q-axis estimated power by an equation (4.1). In the pattern (a), Kq=0.

$$Kq = Wq\_\mathrm{lim}/|Wq\_est| \tag{4.1}$$

Further, the limit gain calculator 451 calculates a d-axis voltage limit gain Kd obtained by dividing the d-axis target power Wd_lim by an absolute value |Wd_est| of the d-axis estimated power by an equation (4.2).

$$Kd = Wd\_\mathrm{lim}/|Wd\_est| \tag{4.2}$$

S14 and S24 following the above may be performed in parallel regardless of the processing order. In FIG. 3, the priority axis side is described first, and the non-priority axis side is described later. In S14, it is determined whether the absolute value |Wq_est| of the q-axis estimated power is larger than the q-axis target power Wq_lim. In S24, it is determined whether the absolute value |Wd_est| of the d-axis estimated power is larger than the d-axis target power Wd_lim.

In case of YES in S14, in S15, the q-axis voltage instruction value limiter 452 multiplies the q-axis voltage instruction value Vq* by the q-axis voltage limit gain Kp by an equation (5.1) to have the post-limit q-axis voltage instruction value is Vq. In the pattern (a), Vq=0.

$$Vq^{**} = Kq \times Vq^* \tag{5.1}$$

In case of NO in S14, the q-axis voltage instruction value limiter 452 in S17 outputs the q-axis voltage instruction value Vq* as is, i.e., without limitation, according to the equation (5.2), that is, "Kp=1" as the q-axis voltage instruction value Vq**.

$$Vq^{**} = Vq^* \tag{5.2}$$

In case of YES in S24, the d-axis voltage instruction value limiter 453 in S26 multiplies the d-axis voltage instruction value Vd* by the d-axis voltage limit gain Kd by an equation (6.1) to have the post-limit d-axis voltage instruction value Vd**.

$$Vd^{**} = Kd \times Vd^* \tag{6.1}$$

In case of NO in S24, the d-axis voltage instruction value limiter 453 in S27 outputs the d-axis voltage instruction value Vd* as is, i.e., without limitation, according to an equation (6.2), that is, setting "Kd=1," as the post-limit d-axis voltage instruction value Vd**.

$$Vd^{**} = Vd^* \tag{6.2}$$

In the d-axis voltage limit prioritize process shown in FIG. 4, the d-axis voltage instruction value limiter 453 performs S25 and S27, and the q-axis voltage instruction value limiter 452 performs S16 and S17. The other steps are assumed to be performed by the limit gain calculator 451. FIG. 4 is obtained by simply reversing the q axis and the d axis in FIG. 3, and steps substantially the same as those in FIG. 3 have the same step numbers without description S11 in FIG. 4 is the same as FIG. 3.

In S22, the limit gain calculator 451 sets (i) a q-axis target power Wq_lim that is a value equal to or greater than 0 and (ii) a d-axis target power Wd_lim that is a value equal to or greater than 0. The q-axis target power Wq_lim, which is on the non-priority axis, is set to the total target power W_lim by an equation (2.2).

$$Wq\_\mathrm{lim} = W\_\mathrm{lim} \tag{2.2}$$

In the pattern (a), the d-axis target power Wd_lim, which is on the priority axis, is set to 0 by an equation (3.2a). In the pattern (b), the d-axis target power Wd_lim is set to a value obtained by subtracting an absolute value |Wq_est| of the estimated power of the q-axis that is the non-priority axis from the total target power W_lim according to an equation (3.2b).

$$Wd\_\mathrm{lim} = 0 \tag{3.2a}$$

$$Wd\_\mathrm{lim} = W\_\mathrm{lim} - |Wq\_est| \tag{3.2b}$$

In S23, the limit gain calculator 451 calculates the q-axis voltage limit gain Kp and the d-axis voltage limit gain Kd by the same equations (4.1) and (4.2) as S13 in FIG. 3. In the pattern (a), Kd=0.

$$Kq = Wq\_\mathrm{lim}/|Wq\_est| \tag{4.1}$$

$$Kd = Wd\_\mathrm{lim}/|Wd\_est| \tag{4.2}$$

S24 and S14 are the same as FIG. 3, even though the order of description is reversed. In case of YES in S24, the d-axis voltage instruction value limiter 453 in S25 calculates the post-limit d-axis voltage instruction value Vd by the same equation (6.1) as S26 in FIG. 3. In the pattern (a), Vd=0. In case of NO in S24, S27 is the same as FIG. 3.

$$Vd^{**}=Kd \times Vd^* \quad (6.1)$$

In case of YES in S14, then in S16, the q-axis voltage instruction value limiter 452 calculates the post-limit q-axis voltage instruction value Vq** by the same equation (5.1) as S15 in FIG. 3. In case of NO in S14, S17 is the same as FIG. 3.

$$Vq^{**}=Kq \times Vq^* \quad (5.1)$$

Figure 5:
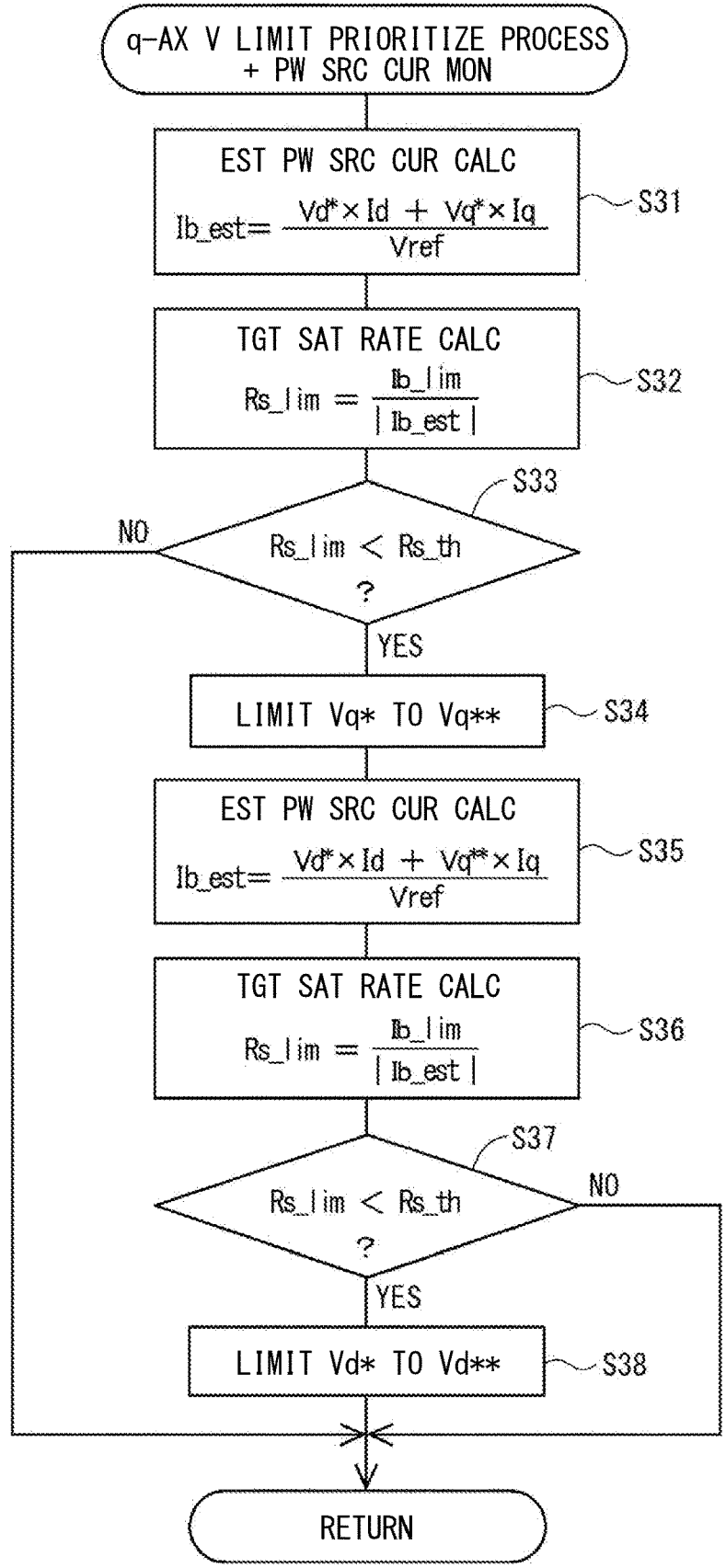
FIG. 5 is a flowchart of a process for determining whether or not a d-axis voltage instruction value needs to be limited by monitoring a power source current after the q-axis voltage limit prioritize process.
Figure 6:
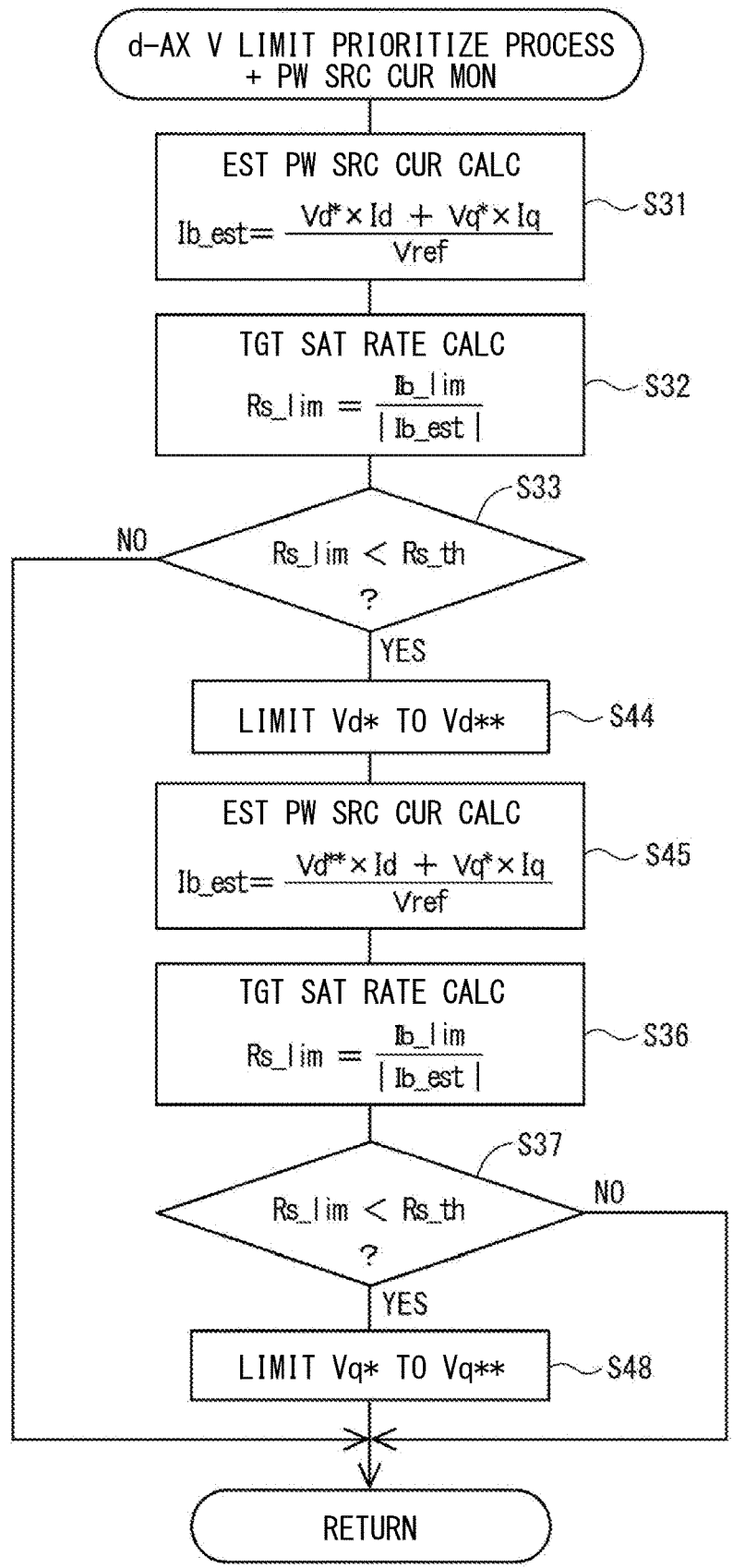
FIG. 6 is a flowchart of a process for determining whether or not a q-axis voltage instruction value needs to be limited by monitoring a power source current after the d-axis voltage limit prioritize process.

Next, referring to the flowcharts of FIGS. 5 and 6, a process, after limiting the voltage instruction value of the priority axis, for determining whether or not to further limit the voltage instruction value of the non-priority axis based on a target saturation rate Rs_lim of the power source current is described. In the processing of FIG. 3 and FIG. 4 described above, the limit gains of the priority axis and the non-priority axis are initially set, and when the estimated power of each axis exceeds the target power, regardless of the execution order of the limitations, the voltage instruction values for both of the dq axes are limited.

On the other hand, in the processing of FIGS. 5 and 6, only the voltage instruction value of the priority axis is limited first, and then the voltage instruction value of the non-priority axis is further limited only when the power source current is not sufficiently suppressed, which is a difference therefrom. In other words, the meaning of "prioritized limitation" is extended not only to the difference in the values of the limit gain but also to the execution order of limitation. Further, in the processing of FIGS. 5 and 6, whether or not the voltage instruction value needs to be limited is determined by comparing the estimated power source current with the target power source current. That is, a degree of suppression of the power source current, which is the main purpose of the present embodiment, is directly monitored by the power source current monitor unit 44.

FIG. 5 shows a process for monitoring the power source current after performing the q-axis voltage limit prioritize process. In S31, the power source current monitor unit 44 calculates an estimated power source current Ib_est, which is an estimation value of the power source current, using an equation (7.1). Here, the reference voltage Vref is a constant that does not depend on the actual inverter voltage, and for example, 12 [V] is used as Vref.

$$Ib\_est=(Vd^* \times Id + Vq^* \times Iq)/Vref \quad (7.1)$$

In other embodiments, instead of using a process of S31, the power source current detection value Ib_sns detected by the power source current sensor 15 shown in FIG. 1 may be obtained. In such case, the estimated power source current Ib_est described below is interpreted as the power source current detection value Ib_sns. Further, it is assumed that (i) this process is performed during the regenerative operation, and (ii) "Ib_est<0" is satisfied. If such assumptions are not provided, "Ib_est<0" may be determined after S31, and, in case of NO in such step, i.e., during the power running operation or during stopping, the routine may be terminated.

The power source current monitor unit 44 stores the target power source current Ib_lim internally, or obtains a value calculated in the other block. In S32, the power source current monitor unit 44 calculates the target saturation ratio Rs_lim by dividing the target power source current Ib_lim, which is a positive value, by an absolute value |Ib_est| of the estimated power source current by an equation (8). When the absolute value |Ib_est| of the estimated power source current exceeds the target power source current Ib_lim, it is a target of this process to limit the absolute value |Ib_est| of the estimated power source current to the target power source current Ib_lim or less. The target saturation rate Rs_lim represents a degree of achievement of such target, and may preferably be a value as large as possible from the standpoint of protecting the circuit.

$$Rs\_lim=Ib\_lim/|Ib\_est| \quad (8)$$

In S33, the power source current monitor unit 44 determines whether the target saturation rate Rs_lim is less than a saturation rate threshold Rs_th. The saturation rate threshold Rs_th may simply be set to a value of 1. Further, when considering a safety margin for the target power source current Ib_lim, the saturation rate threshold Rs_th may be set to a value of 1.1 to 1.5, for example. However, when the target power source current Ib_lim itself includes a safety margin, the saturation rate threshold Rs_th may be a value of 1 or less. When the target saturation rate Rs_lim is equal to or greater than the saturation rate threshold Rs_th, it is not necessary to suppress the power source current. Therefore, NO is determined in S33 and the routine is terminated.

On the other hand, if the target saturation rate Rs_lim is less than the saturation rate threshold Rs_th, YES is determined in S33, and the power source current monitor unit 44 notifies the voltage instruction value limit unit 45 that the voltage instruction value needs to be limited. Accordingly, in S34, the voltage instruction value limit unit 45 limits only the q-axis voltage instruction value Vq* to the post-limit q-axis voltage instruction value Vq** by performing the q-axis voltage limit prioritize process. In such manner, the brake torque of the motor 80 is securely provided, and the impact on the mechanical parts is reduced.

After performing the q-axis voltage limit prioritize process, it is conceivable that the dq-axis currents Id and Iq respectively change in response to the current feedback control. In S35, the power source current monitor unit 44 calculates again the estimated power source current Ib_est by the equation (7.2), in which Vq* is changed to Vq**.

$$Ib\_est=(Vd^* \times Id + Vq^{**} \times Iq)/Vref \quad (7.2)$$

The power source current monitor unit 44 calculates the target saturation rate Rs_lim again in S36, and determines whether the target saturation rate Rs_lim is less than the saturation rate threshold Rs_th in S37. If the target saturation rate Rs_lim is equal to or greater than the saturation rate threshold Rs_th, NO is determined in S37 and the routine is terminated.

On the other hand, when the target saturation rate Rs_lim is less than the saturation rate threshold Rs_th, it is determined as YES in S37, and the power source current monitor unit 44 notifies the voltage instruction value limit unit 45 that further limitation of the voltage instruction value is necessary. In response to such notification, the voltage instruction value limit unit 45 further limits the d-axis voltage instruction value Vd* to the post-limit d-axis voltage instruction value Vd** in S38. In such manner, the power source current is further suppressed to approach the target value.

Note that, in the q-axis voltage limit prioritize process, when the target saturation rate Rs_lim is less than the saturation rate threshold Rs_th, the process of changing the limit gain Kp is repeated for several times, and, in case that the target saturation rate Rs_lim does not yet reach the saturation rate threshold Rs_th, the process may be shifted to the limitation of the d-axis voltage instruction value Vd*.

FIG. 6 shows a process for monitoring the power source current after the d-axis voltage limit prioritize process is performed. FIG. 6 is obtained by simply reversing the q-axis and the d-axis in FIG. 5, and steps are substantially the same as those in FIG. 5, thereby omitting the description. S31 to S33 are the same as the ones in FIG. 5. In S44 which replaces S34, the voltage instruction value limit unit 45 limits only the d-axis voltage instruction value Vd* to the post-limit d-axis voltage instruction value Vd** by performing the d-axis voltage limit prioritize process. In such manner, the brake torque of the motor 80 is reduced, and the steering operation is less likely to be hindered.

In S45 which replaces S35, the power source current monitor unit 44 re-calculates the estimated power source current Ib_est by an equation (7.3), in which Vd* is changed to Vd**.

$$Ib\_est = (Vd^{**} \times Id + Vq^* \times Iq)/Vref \quad (7.3)$$

S36 and S37 are the same as those in FIG. 5. In S48 which replaces S38, the voltage instruction value limit unit 45 further limits the q-axis voltage instruction value Vq* to the post-limit q-axis voltage instruction value Vq**.

Figure 7:
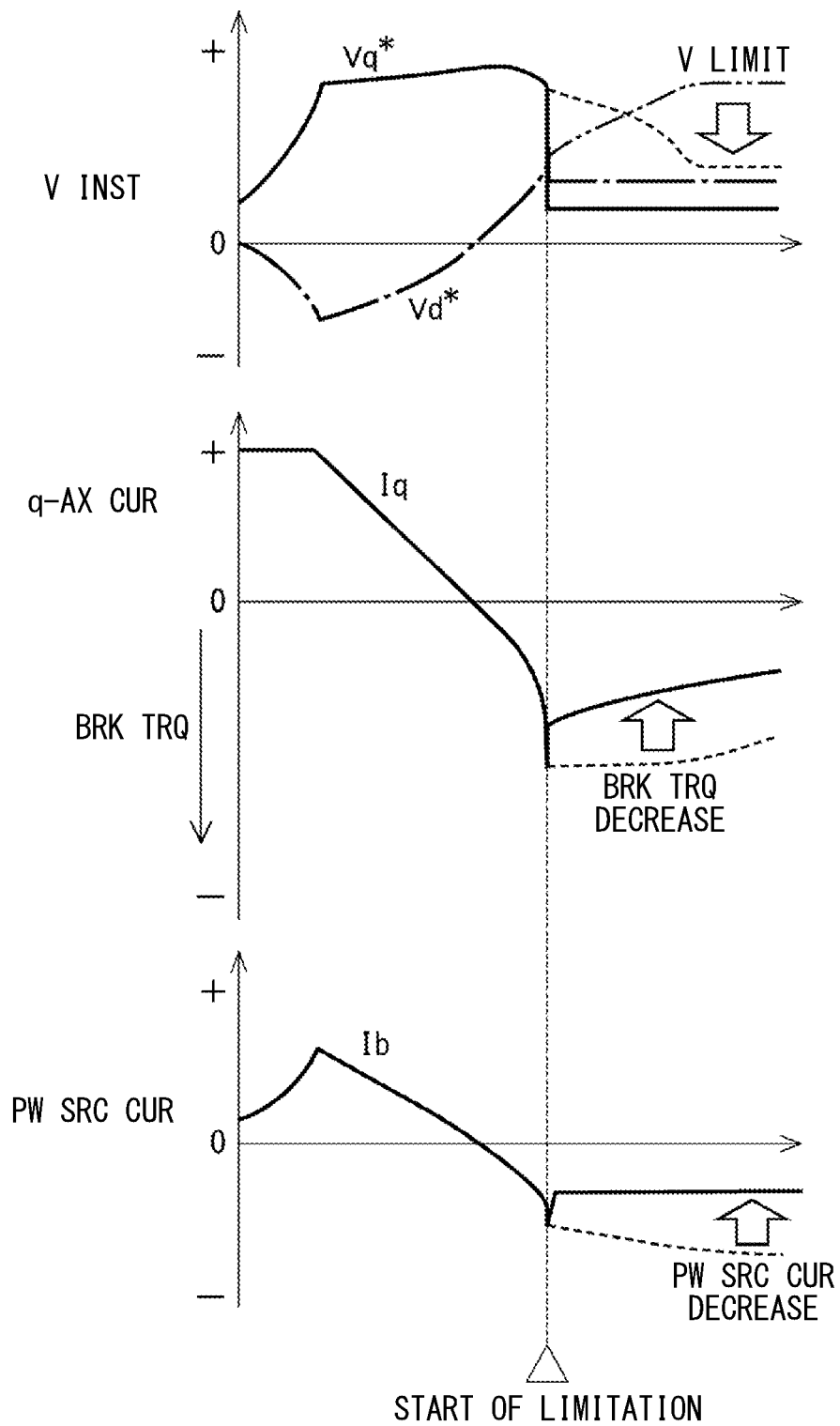
FIG. 7 is a diagram for illustrating effects of a voltage instruction value limiting process of a comparative example.
Figure 8:
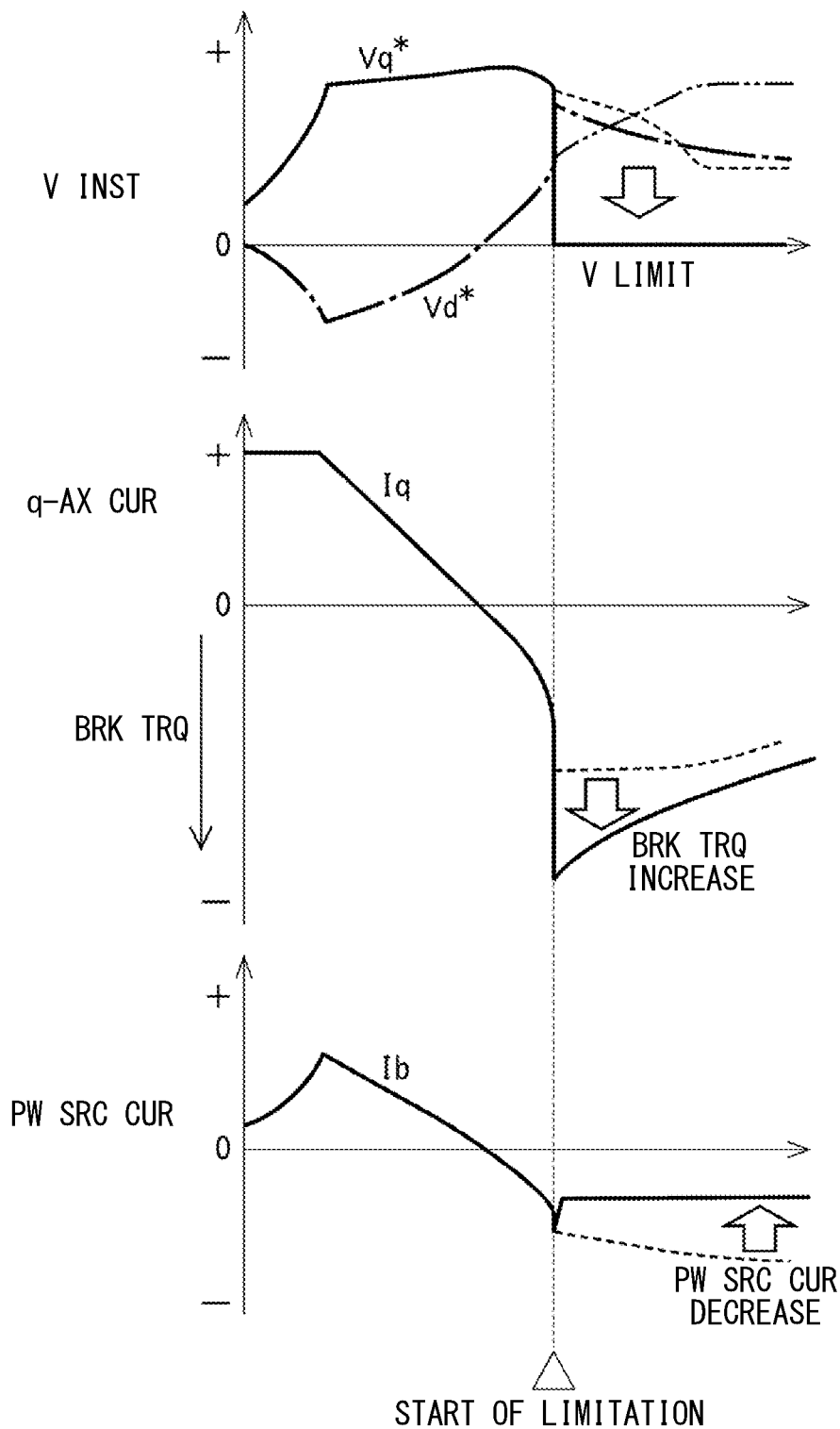
FIG. 8 is a diagram for illustrating effects of the q-axis voltage limit prioritize process according to the first embodiment.

Next, with reference to FIG. 7 and FIG. 8, the effects by the present embodiment are illustrated, in contrast to a comparative example of the related art. The comparative example shown in FIG. 7 corresponds to the related art, which uniformly limits the dq-axis voltage instruction values Vq* and Vd*. FIG. 8 shows an example of limiting the q-axis voltage instruction value Vq* to 0 by the q-axis voltage limit prioritize process, that is, the process of the pattern (a) in FIG. 3.

In FIGS. 7 and 8, the vertical axis represents dq voltage instruction values Vq*, Vd*, a q-axis current Iq, and a power source current Ib, respectively in an order of top to bottom. The brake torque is approximately proportional to the negative q-axis current (i.e., -Iq). The horizontal axis represents a motor rotation number ω, and, the diagrams in FIGS. 7 and 8 respectively show that the limitation of the voltage instruction values Vq* and Vd* has started, in order to suppress the increase of the power source current Ib to the negative side during acceleration (i.e., as the rotation number increases) from the low rotation side to the high rotation side. The solid line and the one-dot chain line in the drawing indicate values when the voltage instruction value is controlled to be limited, and the broken line and the two-dot chain line indicate a value when the voltage instruction value is not controlled.

Before moving on to the description of FIGS. 7 and 8, a general behavior when the motor rotation number ω increases during the regenerative operation is described as a supplement based on voltage equations (9.1) and (9.2). In those equations, R is a resistance, Lq is a q-axis inductance, Ld is a d-axis inductance, and φm is a counter electromotive voltage constant. Note that a differential term of electric current indicating a transient state is omitted.

$$Vd = R \times Id - \omega \times Lq \times Iq \quad (9.1)$$

$$Vq = R \times Iq + \omega \times Ld \times Id + \omega \times \varphi m \quad (9.2)$$

In the explanation of this part, the description of the name of each quantity is omitted, and only the symbol is described. Vq necessary for flowing Iq is as shown in the equation (9.2). As ω increases, a term "ω×φm" of the counter electromotive voltage on the right side of the equation increases to the positive side. Therefore, if Vq on the left side is not increased as much, Iq does not flow as intended. The current feedback control increases Vq to the positive side. However, when ω becomes larger than a certain value, Vq sticks to the upper limit on the positive side, and Iq does not flow as intended but flows on the negative side.

When Iq flows greatly to the negative side, the term "-ω×Lq×Iq" on the right side of the equation (9.1) increases to the positive side. Then, the target Id does not flow unless the left side Vd is increased by the same amount. The current feedback control increases Vd to the positive side. However, when ω becomes larger than a certain value, Vd sticks to the upper limit on the positive side, and Id does not flow as intended but flows on the negative side.

In summary, when the motor rotation number ω is large in the regenerative operation, Iq<0 and Id<0 are satisfied, and Vq and Vd stick to the positive side. When no control is performed in FIGS. 7 and 8, Vq* (i.e., broken line) and Vd* (i.e., two-dot chain line) stick to the positive side. Further, Iq shifts from the positive side to the negative side as ω increases, and greatly increases toward the negative side at the control start point.

Subsequently, a difference of the operation effects between the comparative example and the q-axis voltage limit prioritize process of the present embodiment is described. In the comparative example, the power source current Ib is reduced by limiting both of the q-axis voltage instruction value Vq* and the d-axis voltage instruction value Vd*. However, if the d-axis voltage instruction value Vd* is limited during the regenerative operation, the d-axis current Id becomes larger than the instruction value Id* on the negative side, and the q-axis current Iq flowing toward the negative side due to the counter electromotive voltage approaches 0, thereby the brake torque of the motor 80 decreases. Therefore, the impact of the reverse input may easily be transmitted to the mechanical parts such as gears, and the strength to withstand such impact is required for the mechanical parts.

On the other hand, in the q-axis voltage limit prioritize process according to the present embodiment, the q-axis voltage instruction value Vq* is limited in a prioritized manner, thereby leading to an increase of the q-axis current Iq to the negative side and to an increase of the brake torque of the motor 80. Therefore, the impact on the mechanical parts due to the reverse input is reduced. Further, the power source current Ib is reduced in the same manner as the comparative example.

As described above, when the q-axis voltage limit prioritize process is selected in the present embodiment, the brake torque of the motor 80 can be securely provided so as to reduce an impactive force on the mechanical parts during the regenerative operation due to the reverse input. Further, since the power source current is reduced to the target value, the switching element and the like are prevented from being damaged due to regenerative energy.

Further, when the d-axis voltage limit prioritize process is selected in the present embodiment, the brake torque is reduced so as not to hinder the steering operation during the regenerative operation caused by the operation of the steering wheel. Further, since the power source current is reduced to the target value, the switching element and the like are prevented from being damaged due to regenerative energy.

Second Embodiment

Figure 9:
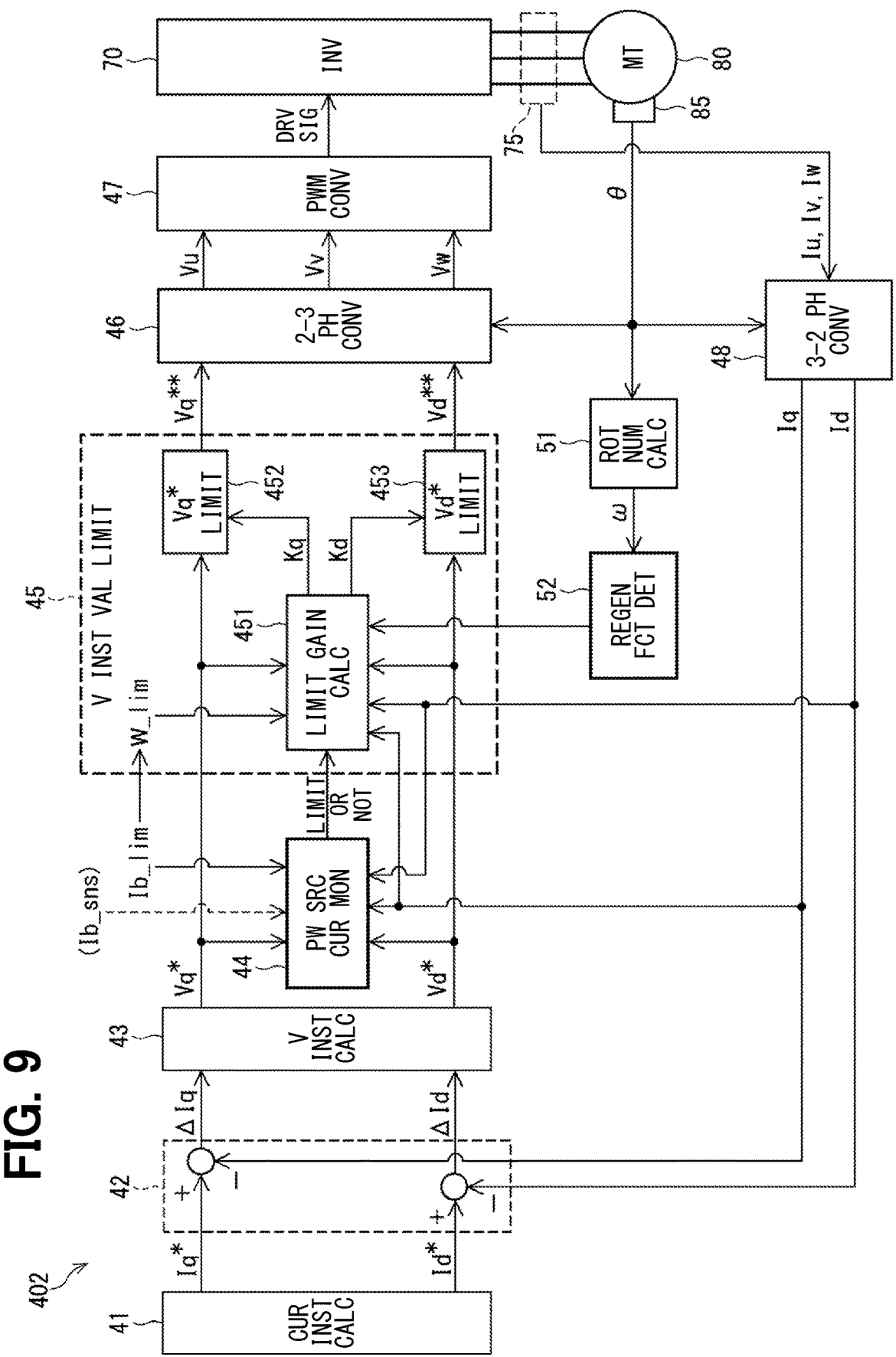
FIG. 9 is a control block diagram of a motor control device according to a second embodiment.

The second embodiment of the present disclosure is described with reference to FIGS. 9 and 10. In the first embodiment, either the q-axis voltage limit prioritize process or the d-axis voltage limit prioritize process is selected in advance, whereas, in the second embodiment, which one of the two processes, i.e., the q-axis voltage limit prioritize process or the d-axis voltage limit prioritize process, is performed is switchably determined according to the cause of the regenerative operation. As shown in FIG. 9, a motor control device 402 according to the second embodiment includes a rotation number calculation unit 51 and a regeneration factor determination unit 52 in addition to the configuration of the motor control device 401 according to the first embodiment. The rotation number calculation unit 51 calculates the motor rotation number ω by differentiating the electrical angle 8 with respect to time.

The regeneration factor determination unit 52 determines which one of the two modes the motor 80 is currently in, i.e., (i) in "a reverse input mode" where the motor 80 performs a regenerative operation by a torque reversely input to the output shaft 88 thereof or (ii) in "a steering operation mode" where the motor 80 performs a regenerative operation due to a driver's operation of the steering wheel 91. In particular, the regeneration factor determination unit 52, configured as shown in FIG. 9, determines that the motor 80 is currently in the reverse input mode when the rotation number is relatively high and that the motor 80 is currently in the steering operation mode when the rotation number is relatively low, based on the motor rotation number ω. The regeneration factor determination unit 52 notifies the determination result to the limit gain calculator 451 of the voltage instruction value limit unit 45.

The limit gain calculator 451 calculates the limit gains Kp and Kd, for the q-axis voltage limit prioritize process in the reverse input mode and for the d-axis voltage limit prioritize process in the steering operation mode, and outputs the gains Kp and Ks to the q-axis voltage instruction value limiter 452 and to the d-axis voltage instruction value limiter 453. In such manner, the voltage instruction value limit unit 45 performs the q-axis voltage limit prioritize process in the reverse input mode for an increase of the brake torque, and performs the d-axis voltage limit prioritize process in the steering operation mode for a decrease of the brake torque.

Figure 10:
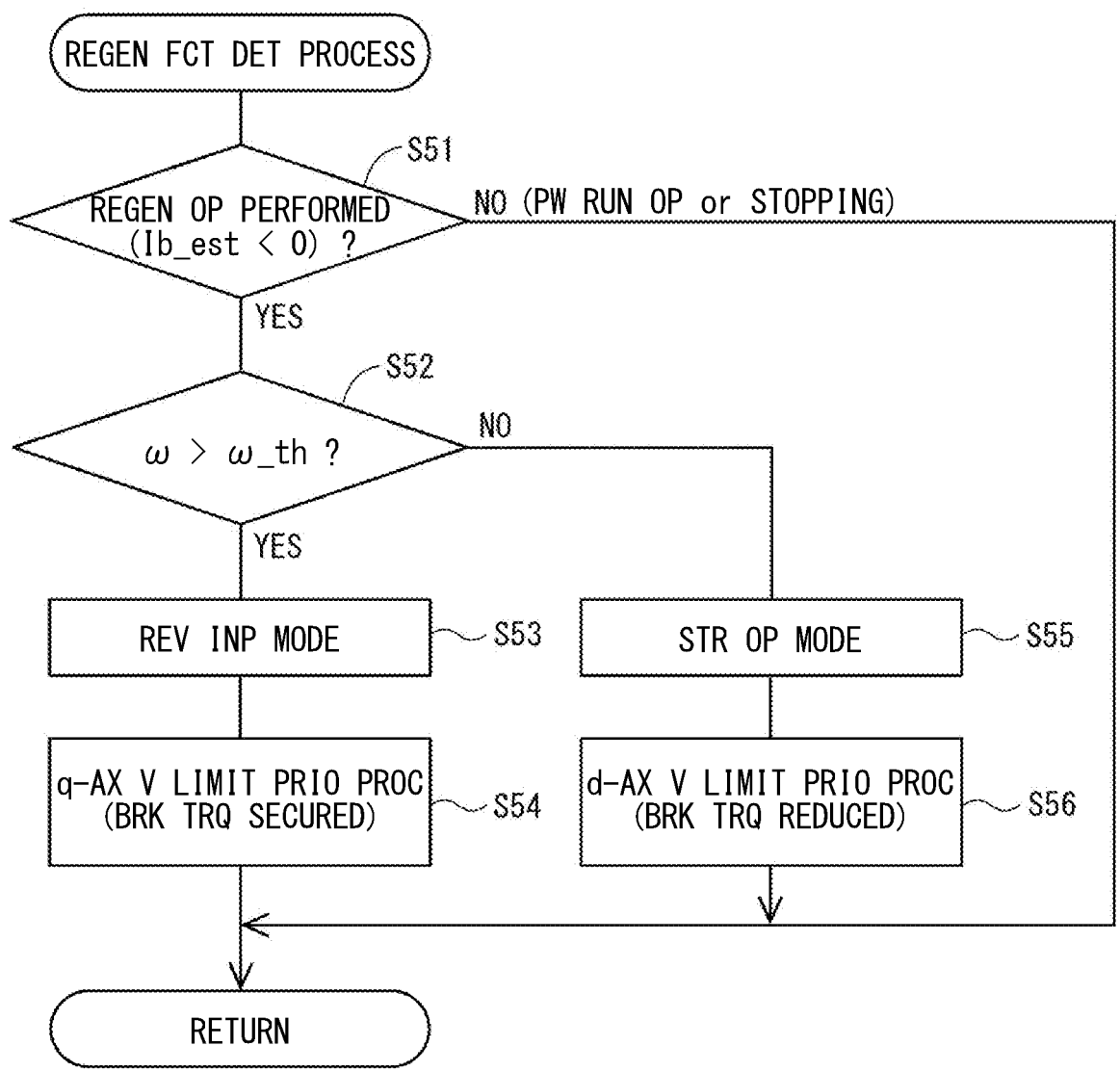
FIG. 10 is a flowchart of a regeneration factor determination process.

FIG. 10 shows a flowchart of the regeneration factor determination process. In S51, for example, it is determined whether the regenerative operation is currently being performed based on whether the estimated power source current Ib_est is negative or not. In case of YES in S51, the process proceeds to S52. In case of NO in S51, that is, the motor 80 is currently performing the power running operation or is currently stopping, the process is terminated.

In S52, it is determined whether the motor rotation number ω is larger than a rotation number threshold ω_th. The rotation number threshold ω_th is set to a value obtained by multiplying the maximum rotation number assumed by the driver's steering operation at the time of emergency avoidance and the like with a reduction ratio. In case of YES in S52, it is determined in S53 that the mode is currently in the reverse input mode, and in S54, the q-axis voltage limit prioritize process is performed for the purpose of securing a brake torque. In case of NO in S52, it is determined in S55 that the steering operation mode is set, and d-axis voltage limit prioritize processing is performed in S56 for the purpose of reducing the brake torque.

In such manner, in the second embodiment, according to the cause of the regenerative operation, the effects of securing the brake torque by the q-axis voltage limit prioritize process and the effects of reducing the brake torque by the d-axis voltage limit prioritize process can both be achieved without compromise. Note that, in case that the reverse input from the outside (i.e., from the external device) acts gently, there is a possibility of mis-determination that the motor 80 is currently in the steering operation mode. However, since the impact in such case is small, it is considered that there is no problem even if the brake torque is not secured. Further, the rotation number threshold may be set in two stages, and the dq-axis voltage instruction values Vq* and Vd* may be limited to the same level in an intermediate rotation number region as in the related art.

Further, in the rack assist type electric power steering apparatus 90 shown in FIG. 1, when the steering wheel 91 is operated, rotation is detected in an order of the steering torque sensor 94 to the rotation angle sensor 85 of the motor 80. On the other hand, when the rack shaft 97 moves laterally due to an impact on the wheel 98, the rotation angle sensor 85 detects the rotation first. Therefore, as a modification of the second embodiment, the regeneration factor determination unit 52 may determine the reverse input mode and the steering operation mode based on an order of the rotation detection.

Other Embodiments (A) The motor control devices 401 and 402 shown in FIG. 2 and FIG. 9 respectively include a power source current monitor unit 44, and, when the target saturation rate Rs lim is less than the saturation rate threshold Rs th after limiting only the voltage instruction value of the priority axis, the power source current is further reduced by limiting the voltage instruction value of the non-priority axis. However, in other embodiments, a modification in which no power source current monitor unit 44 is provided and, for example, the process is terminated after limiting only the voltage instruction value of the priority axis may also be implementable.

(B) A process of how the dq-axis voltage instruction values Vq* and Vd* are limited by the voltage instruction value limit unit 45 is not limited to a method of the above embodiment shown in FIGS. 3 to 6. For example, based on a relationship in which the target total power W_lim is calculable as a product of the target power source current Ib_lim and the reference voltage Vref, the power calculation in FIGS. 3 and 4 may be converted to an electric current calculation. Further, instead of multiplying 0 as the voltage limit gain, the upper limit or the lower limit may be guarded by having "a limit value=0."

(C) The definition of the target power source current Ib_lim, the target total power W_lim, and the like in terms of whether the value is a positive value or a negative value is not limited to the method of the above embodiments. How those values are defined may be arbitrarily changed according to which direction is positive or negative, together with the use of the absolute values and the relationship of which one is greater/smaller. In other words, a configuration of simply changing the positive-negative definitions of those values in the present disclosure is also encompassed within the technical scope of the present disclosure described in the claims.

The present disclosure should not be limited to the embodiments described above, and various other embodiments may be implemented without departing from the scope of the present disclosure.

The control device and the methods thereof described in the present disclosure may be implemented by a special purpose computer which is configured with a memory and a processor that is programmed to execute one or more particular functions embodied in computer programs. Alternatively, the control device described in the present disclosure and the method thereof may be implemented by a dedicated computer configured as a processor having one or more dedicated hardware logic circuits. Alternatively, the control device and the method thereof described in the present disclosure may be implemented by one or more dedicated computers, which is configured as a combination of (i) a processor and a memory configured as programmed to perform one or more functions, and (ii) a processor configured with one or more hardware logic circuits. The computer programs may be stored, as instructions to be performed by a computer, in a tangible, non-transitory computer-readable storage medium.

What is claimed is:

1. A motor control device implemented in an electric power steering apparatus that generates a steering assist torque by a motor by interchangeably converting a direct current electric power of a power source and an alternating current electric power of the motor with a power conversion circuit according to a power running operation and a regeneration operation of the motor for controlling energization of the motor, the motor control device comprising:
    a voltage instruction value calculation unit configured to calculate a q-axis voltage instruction value and a d-axis voltage instruction value by feedback control of dq-axis currents; and
    a voltage instruction value limit unit configured to limit at least one of the q-axis voltage instruction value and the d-axis voltage instruction value, wherein
    during the regenerative operation of the motor, the voltage instruction value limit unit performs
       a q-axis voltage limit prioritize process for limiting the q-axis voltage instruction value over the d-axis voltage instruction value, or
       a d-axis voltage limit prioritize process for limiting the d-axis voltage instruction value over the q-axis voltage instruction value.

2. The motor control device according to claim 1 further comprising:
    a power source current monitor unit configured to compare (i) an absolute value of an estimation value or a detection value of a power source current flowing between the power source and the power conversion circuit and (ii) an upper limit target of an absolute value of the power source current and for calculating a target saturation rate obtained by dividing the upper limit target of the absolute value of the power source current by the absolute value of the estimation value of the power source current, wherein
    the voltage instruction value limit unit
    performs the q-axis voltage limit prioritize process in which, after limiting only the q-axis voltage instruction value, the d-axis voltage instruction value is further limited when the target saturation rate is less than a predetermined saturation rate threshold, and
    performs the d-axis voltage limit prioritize process in which, after limiting only the d-axis voltage instruction value, the q-axis voltage instruction value is further limited when the target saturation rate is less than the saturation rate threshold.

3. The motor control device according to claim 1, wherein based on a definition that (i) an electric power allowed to be input to the power conversion circuit by the regenerative operation is designated as a total target power, and (ii) a q-axis power and a d-axis power constituting the total target power are respectively designated as a q-axis target power and a d-axis target power, and the total target power, the q-axis target power, and the d-axis target power are all regulated as a value of 0 or more,
    the voltage instruction value limit unit
    calculates a q-axis estimated power as a product of the q-axis voltage instruction value and the q-axis current, and a d-axis estimated power as a product of the d-axis voltage instruction value and the d-axis current, and
    further calculates a q-axis voltage limit gain by dividing the q-axis target power by the absolute value of the q-axis estimated power, and a d-axis voltage limit gain by dividing the d-axis target power by the absolute value of the d-axis estimated power,
    limits the q-axis voltage instruction value by multiplying the q-axis voltage limit gain, when the absolute value of the q-axis estimated power is larger than the q-axis target power, and
    limits the d-axis voltage instruction value by multiplying the d-axis voltage limit gain, when the absolute value of the d-axis estimated power is larger than the d-axis target power.

4. The motor control device of claim 3, wherein the voltage instruction value limit unit performs limitation of the target power, in view of the q-axis target power and the d-axis target power, by setting a value of the target power of a priority axis to 0 and setting a value of the target power of a non-priority axis to the total target power, the target axis being an axis where the limitation of the voltage instruction value is limited with priority and the non-priority axis being an axis other than the priority axis.

5. The motor control device of claim 3, wherein
    the voltage instruction value limit unit performs limitation of the target power, in view of the q axis target power and the d-axis target power, by setting the target power of a priority axis to a value derived by subtracting the absolute value of the estimated power of the non-priority axis from the total target power and setting the target power of a non-priority axis to the total target power, the target axis being an axis where the limitation of the voltage instruction value is limited with priority and the non-priority axis being an axis other than the priority axis.

6. The motor control device of claim 1 further comprising:
    a regeneration factor determination unit configured to determine which one of a reverse input mode or a steering operation mode the motor is currently in, the reverse input mode being a mode where the motor performs the regeneration operation by a torque reversely input to an output shaft of the motor and the steering operation mode being a mode where the motor performs the regeneration operation by an operation of a steering wheel by a driver, wherein
    the voltage instruction value limit unit
    performs the q-axis voltage limit prioritize process in the reverse input mode, and
    performs the d-axis voltage limit prioritize process in the steering operation mode.

7. The motor control device according to claim 1, wherein during the regenerative operation of the motor, the voltage instruction value limit unit,
    in the q-axis voltage limit prioritize process,
       limits the q-axis voltage instruction value to suppress the power source current without limiting the d-axis voltage instruction value, and
       limits the d-axis voltage instruction value on determination that the power source current is not sufficiently suppressed, and n the d-axis voltage limit prioritize process,
limits the d-axis voltage instruction value to suppress the power source current without limiting the q-axis voltage instruction value, and
limits the q-axis voltage instruction value on determination that the power source current is not sufficiently suppressed.

8. A method for generating a steering assist torque by a motor by interchangeably converting a direct current electric power of a power source and an alternating current electric power of the motor with a power conversion circuit according to a power running operation and a regeneration operation of the motor for controlling energization of the motor, the method comprising:
calculating a q-axis voltage instruction value and a d-axis voltage instruction value by feedback control of dq-axis currents; and
limiting at least one of the q-axis voltage instruction value and the d-axis voltage instruction value, wherein
during the regenerative operation of the motor, the limiting process performs,
a q-axis voltage limit prioritize process for limiting the q-axis voltage instruction value over the d-axis voltage instruction value, or
a d-axis voltage limit prioritize process for limiting the d-axis voltage instruction value over the q-axis voltage instruction value.

9. The method according to claim 8, wherein
during the regenerative operation of the motor, the limiting process,
in the q-axis voltage limit prioritize process,
limits the q-axis voltage instruction value to suppress the power source current without limiting the d-axis voltage instruction value, and
limits the d-axis voltage instruction value on determination that the power source current is not sufficiently suppressed, and
in the d-axis voltage limit prioritize process,
limits the d-axis voltage instruction value to suppress the power source current without limiting the q-axis voltage instruction value, and
limits the q-axis voltage instruction value on determination that the power source current is not sufficiently suppressed.

\* \* \* \* \*